United States Patent
Muthiah et al.

(10) Patent No.: US 10,725,901 B2
(45) Date of Patent: Jul. 28, 2020

(54) STORAGE SYSTEM AND METHOD FOR SOFT-DECISION-BASED COMMAND EXECUTION TO ENHANCE RANDOM WRITE PERFORMANCE

(71) Applicant: Western Digital Technologies, Inc., San Jose, CA (US)

(72) Inventors: Ramanathan Muthiah, Bangalore (IN); Nikhil Ranjan, Bangalore (IN)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 15/994,551

(22) Filed: May 31, 2018

(65) Prior Publication Data

US 2019/0370168 A1 Dec. 5, 2019

(51) Int. Cl.
| | |
|---|---|
| *G06F 9/38* | (2018.01) |
| *G06F 13/16* | (2006.01) |
| *G06F 12/02* | (2006.01) |
| *G06F 3/06* | (2006.01) |
| *G06F 12/0802* | (2016.01) |

(52) U.S. Cl.
CPC .......... *G06F 12/0246* (2013.01); *G06F 3/061* (2013.01); *G06F 3/0604* (2013.01); *G06F 3/0659* (2013.01); *G06F 3/0679* (2013.01); *G06F 9/3855* (2013.01); *G06F 12/0292* (2013.01); *G06F 12/0802* (2013.01); *G06F 13/1626* (2013.01); *G06F 2212/7201* (2013.01)

(58) Field of Classification Search
CPC ... G06F 9/3836–3859; G06F 12/00–16; G06F 13/00–4295; G06F 13/14–18
See application file for complete search history.

(56) References Cited

U.S. PATENT DOCUMENTS

| | | | |
|---|---|---|---|
| 7,624,221 B1 * | 11/2009 | Case | G06F 13/1626 710/18 |
| 9,317,204 B2 | 4/2016 | Hahn et al. | |
| 2003/0023815 A1 * | 1/2003 | Yoneyama | G06F 3/0611 711/133 |
| 2011/0072193 A1 * | 3/2011 | Yeh | G06F 12/0246 711/103 |
| 2012/0226871 A1 * | 9/2012 | Cantin | G06F 12/123 711/135 |
| 2015/0302903 A1 * | 10/2015 | Chaurasia | G11C 7/1072 711/105 |
| 2016/0147671 A1 * | 5/2016 | Vishne | G06F 12/12 711/135 |
| 2016/0188510 A1 | 6/2016 | Singh et al. | |
| 2016/0306549 A1 | 10/2016 | Nadakuditi et al. | |
| 2017/0083252 A1 | 3/2017 | Singh et al. | |
| 2017/0140814 A1 * | 5/2017 | Puthenthermadam | G11C 16/3427 |

(Continued)

*Primary Examiner* — Nicholas J Simonetti

(74) *Attorney, Agent, or Firm* — Brinks Gilson & Lione

(57) ABSTRACT

A storage system and method for soft-decision-based command execution to enhance random write performance are provided. In one embodiment, the storage system comprises a memory and a controller. The controller comprises a command parser and a set of components in a path between the command parser and the memory, wherein the command parser is configured to receive a plurality of commands from a host and determine an order in which to send the plurality of commands to the set of components based on feedback from the set of components. Other embodiments are provided.

17 Claims, 8 Drawing Sheets

(56) References Cited

U.S. PATENT DOCUMENTS

2018/0275873 A1\* 9/2018 Frid ..................... G06F 3/0679
2019/0073133 A1\* 3/2019 Jiang .................... G06F 3/0608

\* cited by examiner

STORAGE SYSTEM AND METHOD FOR SOFT-DECISION-BASED COMMAND EXECUTION TO ENHANCE RANDOM WRITE PERFORMANCE

BACKGROUND

Controllers in some storage systems have a front end module and a back end module. The front end module receives read/write commands from a host, parses the commands, and stores them in a queue until they are ready to be sent to the back end module. Some front end modules send commands to the back end module in the order in which they are received, while other front end modules take commands out-of-order to combine them into groups (e.g., a group of write commands or a group of read commands). When the back end module receives commands from the front end module, it processes the commands and sends them to the memory of the storage system for completion. The back end module eventually informs the front end module that the command has been completed.

DETAILED DESCRIPTION

Figure 1A:
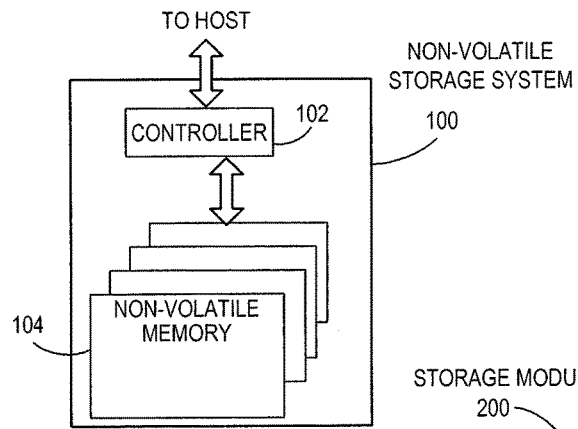
FIG. 1A is a block diagram of a non-volatile storage system of an embodiment.

By way of introduction, the below embodiments relate to a storage system and method for soft-decision-based command execution to enhance random write performance. In one embodiment, a storage system is provided comprising a memory and a controller. The controller comprises a command parser; and a set of components in a path between the command parser and the memory; wherein the command parser is configured to receive a plurality of commands from a host and determine an order in which to send the plurality of commands to the set of components based on feedback from the set of components.

In some embodiments, one of the components in the set of components is configured to track an occupancy level of at least one latch in the memory, and wherein the feedback comprises the occupancy level of the at least one latch in the memory.

In some embodiments, the command parser is further configured to send a write command to the set of components instead of a read command in response to the occupancy level of the at least one latch in the memory being partially full.

In some embodiments, one of the components in the set of components is configured to perform logical-to-physical address translation based on a cached portion of a logical-to-physical address translation table, and wherein the feedback comprises an identification of logical addresses contained in the cached portion of the logical-to-physical address translation table.

In some embodiments, the command parser is further configured to give priority to a command having a logical address contained in the cached portion of the logical-to-physical address translation table over a command having a logical address that is not contained in the cached portion of the logical-to-physical address translation table.

In some embodiments, one of the components in the set of components is configured to track free space remaining in a block of memory, and wherein the feedback comprises an identification of the free space remaining in the block of memory.

In some embodiments, the command parser is further configured to give priority to a write command that requires no more than the amount of free space remaining in the block of memory over a write command that requires more than the amount of free space remaining in the block of memory.

In some embodiments, the memory comprises a three-dimensional memory.

In some embodiments, the storage system is removably connectable to the host.

In some embodiments, the storage system is embedded in the host.

In another embodiment, a method for prioritizing commands in a storage system is provided that is performed in a command parser in a controller of a storage system, wherein the storage system comprises a memory, and wherein the controller further comprises a backend module. The method comprises receiving a plurality of commands from a host; receiving feedback from the backend module; and determining an order in which to send the plurality of commands to the backend module based on feedback from the backend module.

In some embodiments, the feedback comprises information about how full a latch in the memory is, and wherein the command parser sends a write command instead of a read command when the latch is not empty.

In some embodiments, the feedback comprises information about which logical addresses are included in a cached logical-to-physical address map, and wherein the command parser sends command(s) having logical address(es) that are present in the cached logical-to-physical address map before sending other commands.

In some embodiments, the feedback comprises information about free space remaining in a block of memory, and wherein the command parser sends a write command that will not spill over to another block of memory.

In some embodiments, the memory comprises a three-dimensional memory.

In some embodiments, the storage system is removably connectable to the host.

In some embodiments, the storage system is embedded in the host.

In another embodiment, a storage system is provided comprising a memory; and a controller comprising back end means for processing and sending a command to the memory and front end means for receiving a plurality of commands from a host and determining an order in which to send the plurality of commands to the back end means based on feedback from the back end means.

In some embodiments, the front end means comprises a command parser.

In some embodiments, the memory comprises a three-dimensional memory.

Other embodiments are possible, and each of the embodiments can be used alone or together in combination. Accordingly, various embodiments will now be described with reference to the attached drawings.

Figure 1B:
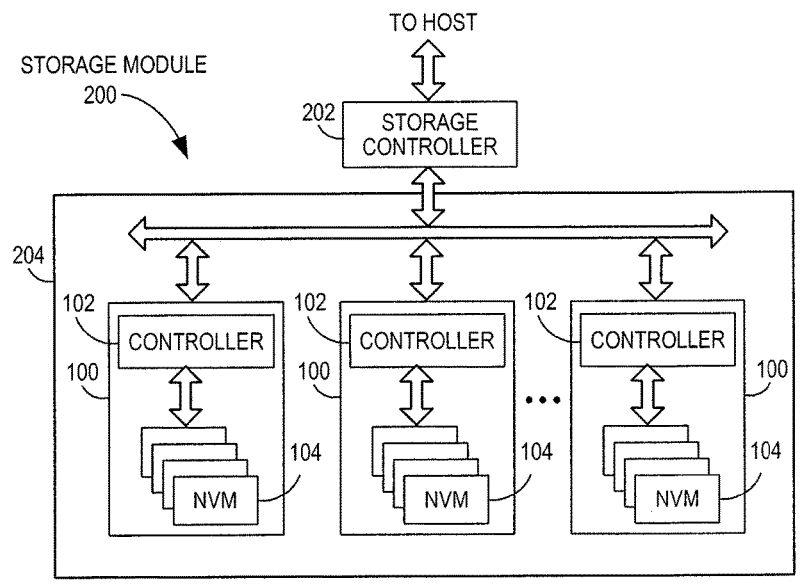
FIG. 1B is a block diagram illustrating a storage module of an embodiment.
Figure 1C:
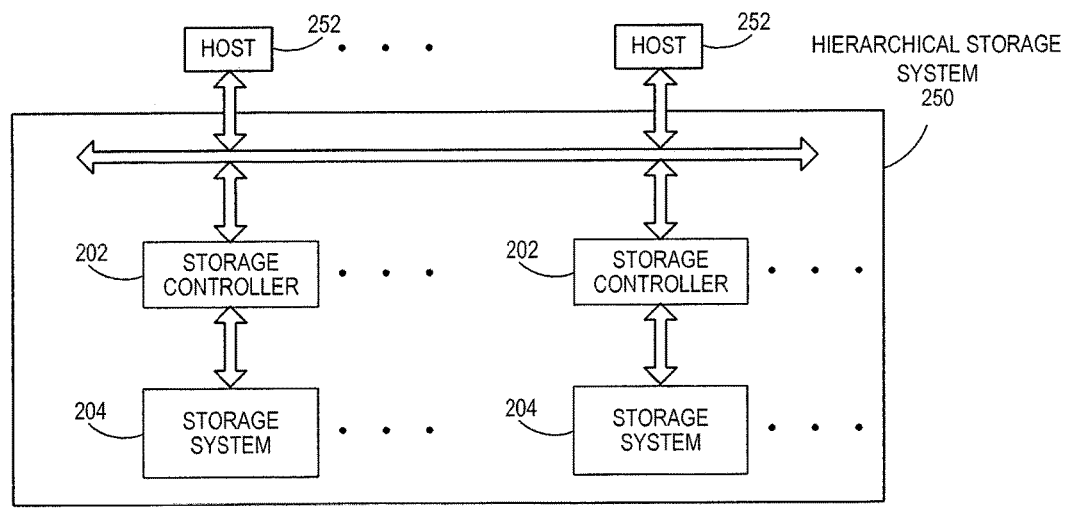
FIG. 1C is a block diagram illustrating a hierarchical storage system of an embodiment.

Storage systems suitable for use in implementing aspects of these embodiments are shown in FIGS. 1A-1C. FIG. 1A is a block diagram illustrating a non-volatile storage system 100 according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random access memory (Re-RAM), phase-change memory (PCM), or a magnetoresistive random access memory (MRAM) controller) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused).

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interface express (PCIe) interface, or dual-date-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
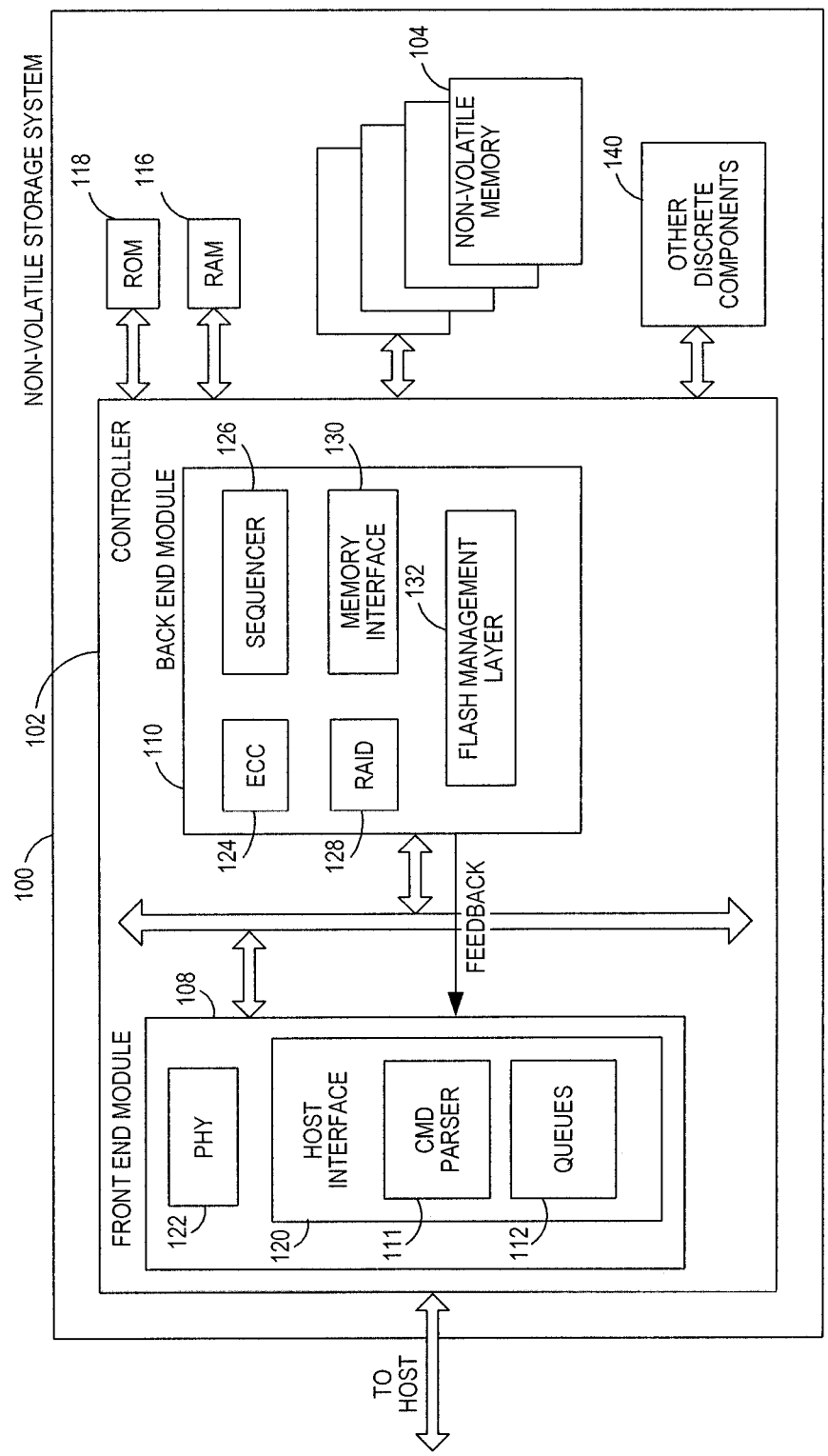
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example.

Referring again to modules of the controller 102, a buffer manager/bus controller manages buffers in random access memory (RAM) 116 and controls the internal bus arbitration of the controller 102. A read only memory (ROM) 118 stores system boot code. Although illustrated in FIG. 2A as located separately from the controller 102, in other embodiments one or both of the RAM 116 and ROM 118 may be located within the controller 102. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, a Serial AT Attachment (SATA), SATA Express, Serial Attached SCSI (SAS), Fibre Channel, Universal Serial Bus (USB), Peripheral Component Interconnect Express (PCIe), and Non-Volatile Memory Express (NVMe) interface.

As shown in FIG. 2A, the host interface 120 in this embodiment comprises command parser 111 and one or more queues 112. In general, the command parser 111 can be responsible for fetching and parsing commands (e.g., read and/or write commands) from the host, making sure they are ok, and queuing them in the queues 112. In some implementations, the queue 112 is referred to as a "command queue," and the command parser 111 is referred to as a "CQ parser."

The command parser 111 can parse commands in any suitable way. For example, in one embodiment, the command parser 111 parses the command by reading an operation code ("op-code") from an op-code field and configuring the appropriate functional blocks in the back end module 110 accordingly. Typically, an op-code (or, more generally, a command code) is associated with each command in a given standard. For example, in the NVMe standard, the size of a command is 64B, and the first 4B in all commands have the same structure. One of the fields in this structure contains the op-code. Examples of op-codes include, but are not limited to, write, read, and flush, which is used by the host to indicate that any data in volatile storage should be flushed to the non-volatile memory 120.

The command parser 111 is also configured to determine an order in which to send a plurality of commands received from a host to the back end module 110. The command parser 111 can store commands in the queue 112 for execution in any desirable order. For example, the order may be based on priority of the request, availability of resources to handle the request, an address needed for the request, the age of the request, or access history of the requestor. In this way, the queue can be used to enable the delay of command execution, either in order of priority, on a first-in first-out basis, or in any other order. Instead of waiting for each command to be executed before sending the next one, the command parser 111 can just put the commands in the queue 112 and can perform other processes while the queue 112 is executed.

The back end module 110 comprises a set of components in a path between the command parser 111 and the memory 104. The following paragraphs provide examples of some types of components that can be in that path. It should be noted that these are merely examples and that other types of components can be used and that the set of components can contain some or none of the components discussed below.

In one embodiment, the back end module 110 includes an error correction controller (ECC) engine 124 that encodes the data bytes received from the host, and decodes and error corrects the data bytes read from the non-volatile memory 104. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash management layer 132 (e.g., flash translation layer (FTL)) translates logical addresses in a command into physical addresses used by the memory. As the logical-to-physical address map for the entire memory can be very large, a portion of the map can be cached (e.g., in RAM 116) for faster access, if the entire map cannot be cached.

In general, the back end module 110 processes commands received from the front end module 108. This processing can include, for example, translating a logical address in a command to a physical address, using a collision table to detect a possible collision in conflicting commands to the same address, generate and compare error correction codes, schedule commands to be send to the memory 104, tracking which commands have been sent to the memory 104 and how much of the data cache (latches) in the memory die 104 is occupied. Typically, the backend module 110 does the bulk of the work processing the command and draws more bandwidth than the front end module 108. As will be discussed in more detail below, in one embodiment, the back end module 110 provides feedback to the front end module 108 to assist it in determining the order in which to send commands to the back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
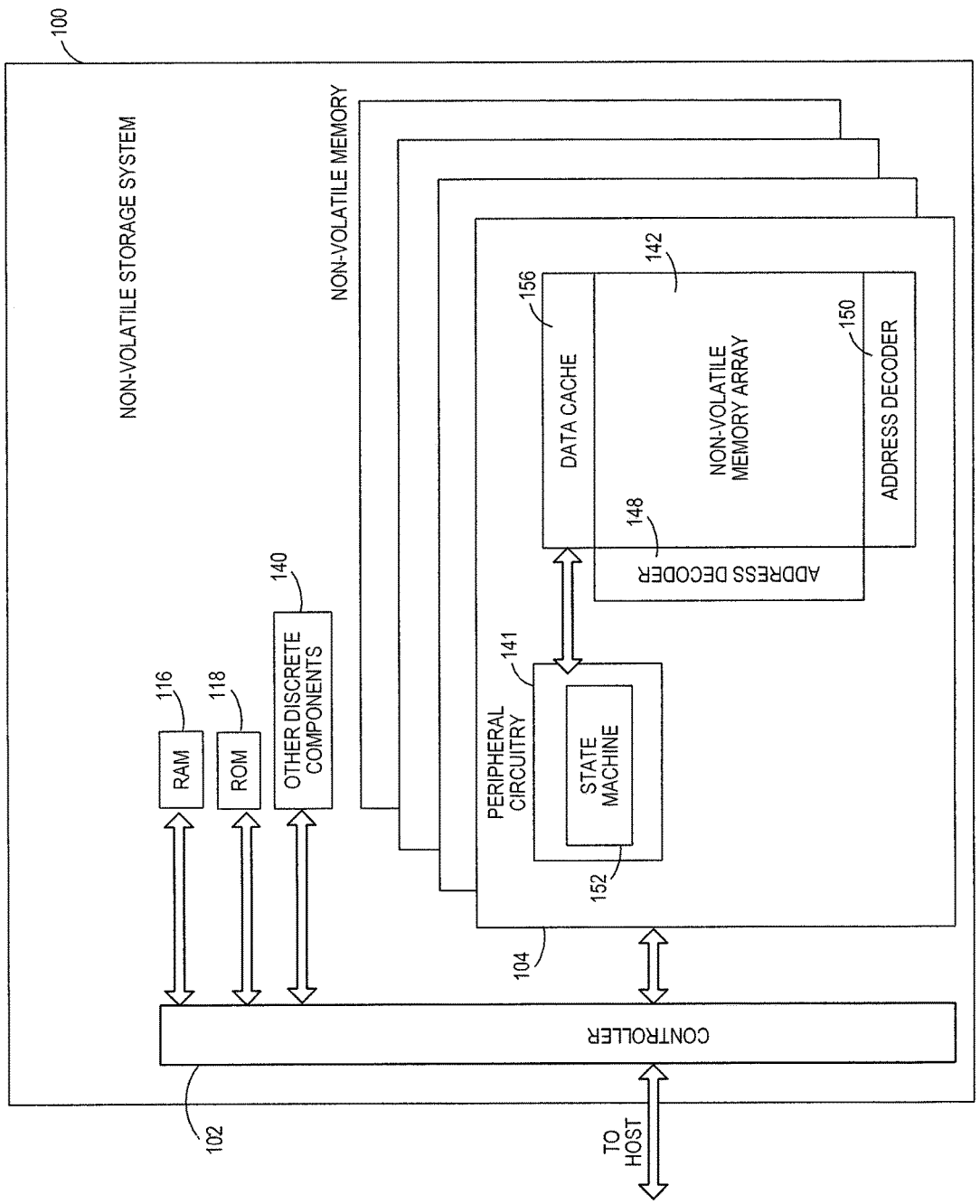
FIG. 2B is a block diagram illustrating components of the non-volatile memory storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data.

The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 (e.g., one or more latches) that caches data. Peripheral circuitry 141 includes a state machine 152 that provides status information to the controller 102.

Figure 3:
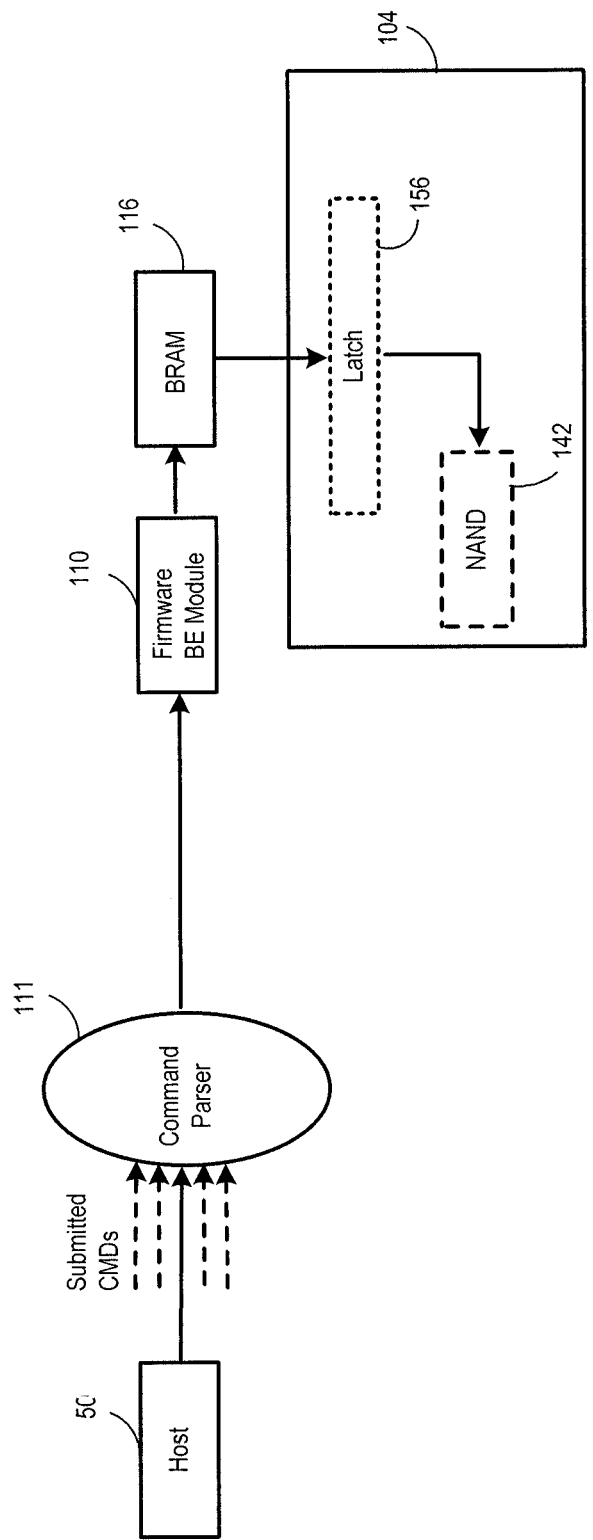
FIG. 3 is an illustration of a storage system of an embodiment that illustrates an operation of a command parser.

As mentioned in the background section above, in some storage systems, the front end of the controller either sends commands to the back end in the order in which the commands were received or takes commands out-of-order to combine them into groups (e.g., a group of write commands or a group of read commands). The front end signals the back end to start processing the tasks one by one. This process is illustrated in the block diagram in FIG. 3. As shown in FIG. 3, a host 50 sends a plurality of commands to the command parser 111 of the front end module 108 of the controller 102. In this example, the command parser 111 batches write commands together and invokes one of them to send to the back end module 110. The back end module 110 processes the command and buffers the data to be written in the memory 104 in a buffer RAM 116. At the appropriate time, the data is transferred from the buffer RAM 116 to one or more latches 156 in the memory 104. Eventually, the memory 104 writes the data from the latch 156 into the memory array 142. When that happens, the back end module 110 can provide a signal to the front end module 108 to indicate that the write operation successfully completed.

As shown in this example, the interaction between the host interface in the front end module and the back end module in prior storage systems is only one way based on data direction. There can be several problems with this arrangement. For example, if the front end receives a read command from the host while the back end is processing write commands, the front end can switch states from write to read and process reads as well, depending on how reads and writes are prioritized in the system. However, this can degrade system performance substantially since the host interface has no idea about the state of the back end module and decides the next state of the command queue's pending commands just based on its own state-machine. This problem is illustrated in FIG. 4.

Figure 4:
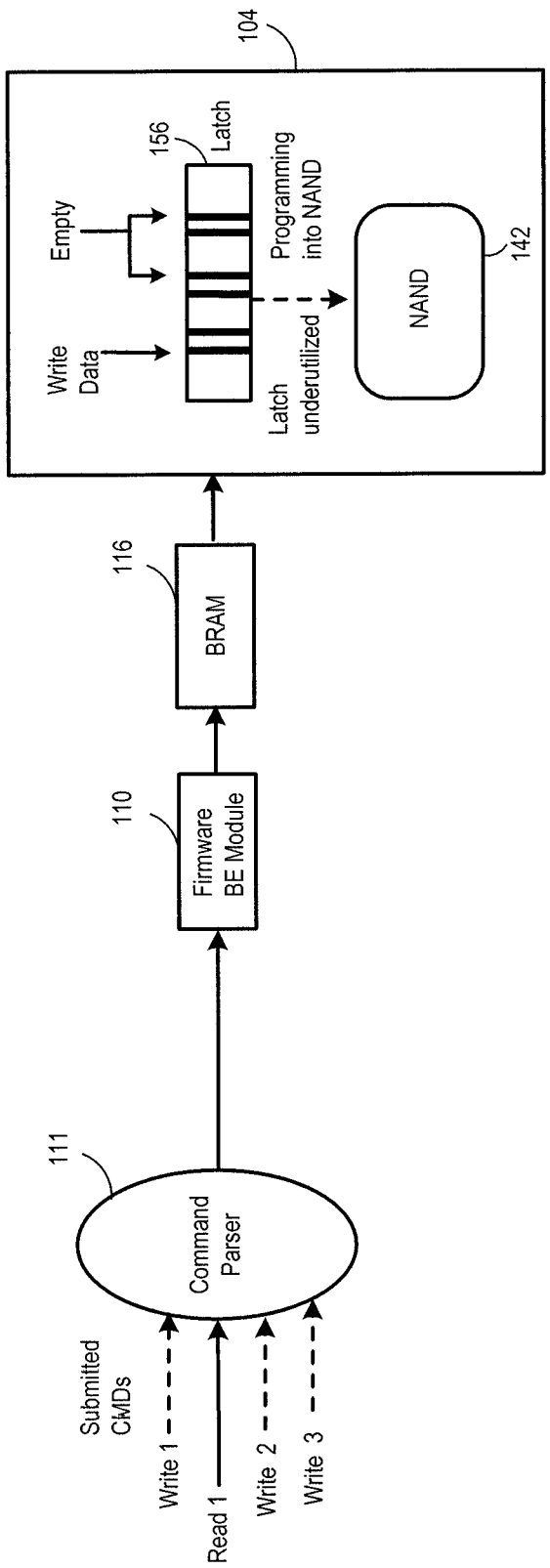
FIG. 4 is an illustration of a storage system of an embodiment that illustrates a use of the storage system.

In the example shown in FIG. 4, four commands are queued by the host in time order as write1, read1, write2, and write3. In a typical approach, the command parser 111 chooses the write1 first and signals the back end 110 to process it. Data will be put on the latch 156 for this command, at which point the latch 156 will only be partially full. Next, the command parser 111 may choose to process read1 according to its own logic. This indirectly forces the back end module 110 to flush the contents of the latch 156 in NAND 142 and start processing read1. Assume that the flushing of latch data into NAND 142 takes 400 microseconds (μsec). After read1 completion, the command parser 111 will choose write2 and write3 back to back, allowing the back end module 110 to process them together to put their data into the latch 156 and then flush the data in the latch 156 into NAND 142. This process would take another 400 μsec. Accordingly, the total time to process three writes in this example took 800 μsec (i.e., 400 μsec+400 μsec).

In one embodiment, the back end module 110 provides feedback to the command parser 111 in the front end module 108 to help the command parser 111 schedule commands, e.g., to maximize random write performance. While prior arrangements have the back end module provide the front end module with a signal when a command is successfully completed or data read from a read operation, such information is not feedback that the command parser can use to determine an order in which to send a plurality of commands to the back end module. That is, such information can prompt the command parser to pick another command from the queue to serve up to the back end module but does not affect the order in which the commands are stored in the queue or served up to the back end module.

Figure 5:
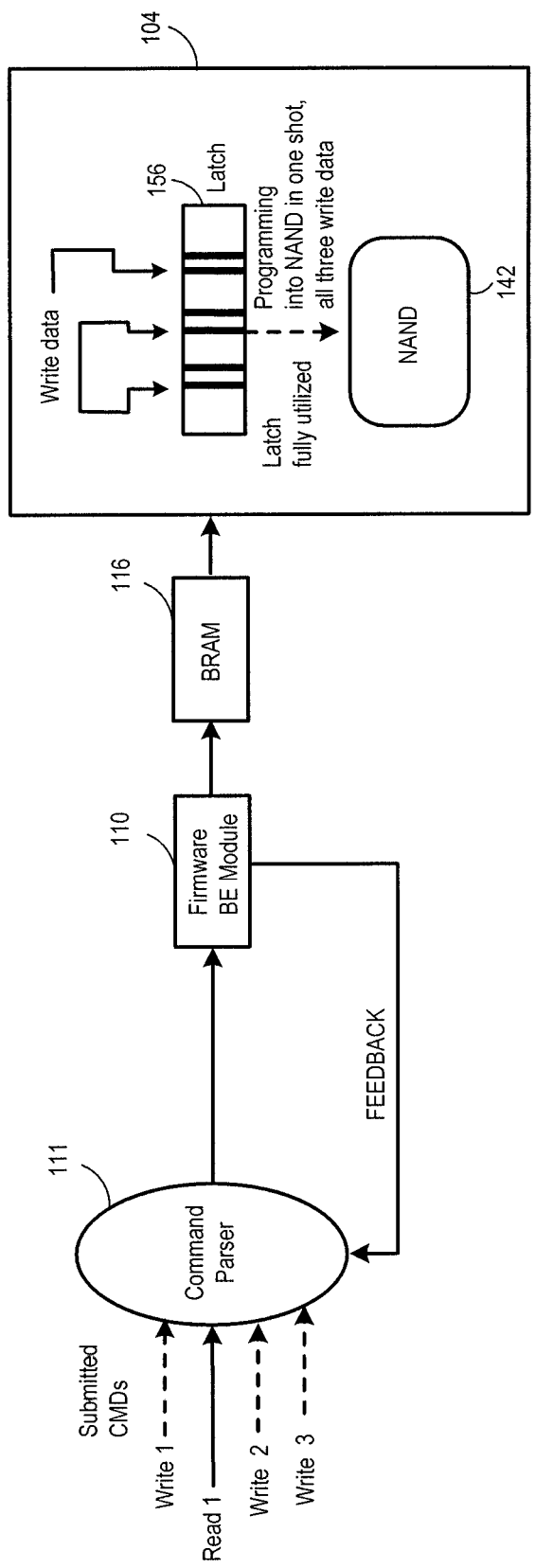
FIG. 5 is an illustration of a storage system of an embodiment in which a command parser receives feedback from a back end module regarding latch capacity in a memory.

FIG. 5 shows how the use of feedback from the back end module 110 can provide a more-efficient result than what was shown in FIG. 4. In the example shown in FIG. 5, the command parser 111 groups the three write commands together, even though they were not received that way from the host. In this example, the feedback from the back end module 110 includes latch occupancy information (as will be discussed below, other or additional feedback information can be provided). The back end module 110 is aware of the occupancy level of the latch 156 because it tracks when data is placed into the latch 156 before it is written to the NAND 142 (read data is temporarily stored is the latch 156 but is read out quickly and, thus, is not usually a concern for occupancy). The current state of the latch 156 in the memory 104 can help the command parser 111 decide whether entertaining further writes at that point of time would help speed up input-output (IO) performance. If the latch 156 is semi-filled with data, the command parser 111 can choose to carry out more writes, making sure that the latches 156 are completely full and then program the same into the NAND 142 at one shot. This would avoid unnecessarily dumping data from a semi-filled latch into the NAND 142 and restart fresh for the next cycle. Accordingly, with this feedback, the command parser 111 can attempt to fully utilize the latch 156 at any given point of time.

In comparison to the example set forth in FIG. 4, in this embodiment, the command parser 111 can more intelligently schedule the four tasks already queued. After write1 is processed, the command parser 111 would be aware (because of the feedback) that the latch 156 is still not full and can be more utilized. Accordingly, the command parser 111 can schedule write2 and write3 and postpone read1 until all the three writes are processed. The latch 156 will be programmed for all three writes and will be dumped into NAND 142 in one shot, taking only 400 μsec to process all the three writes instead of 800 μsec, as in the example from FIG. 4.

Figure 6:
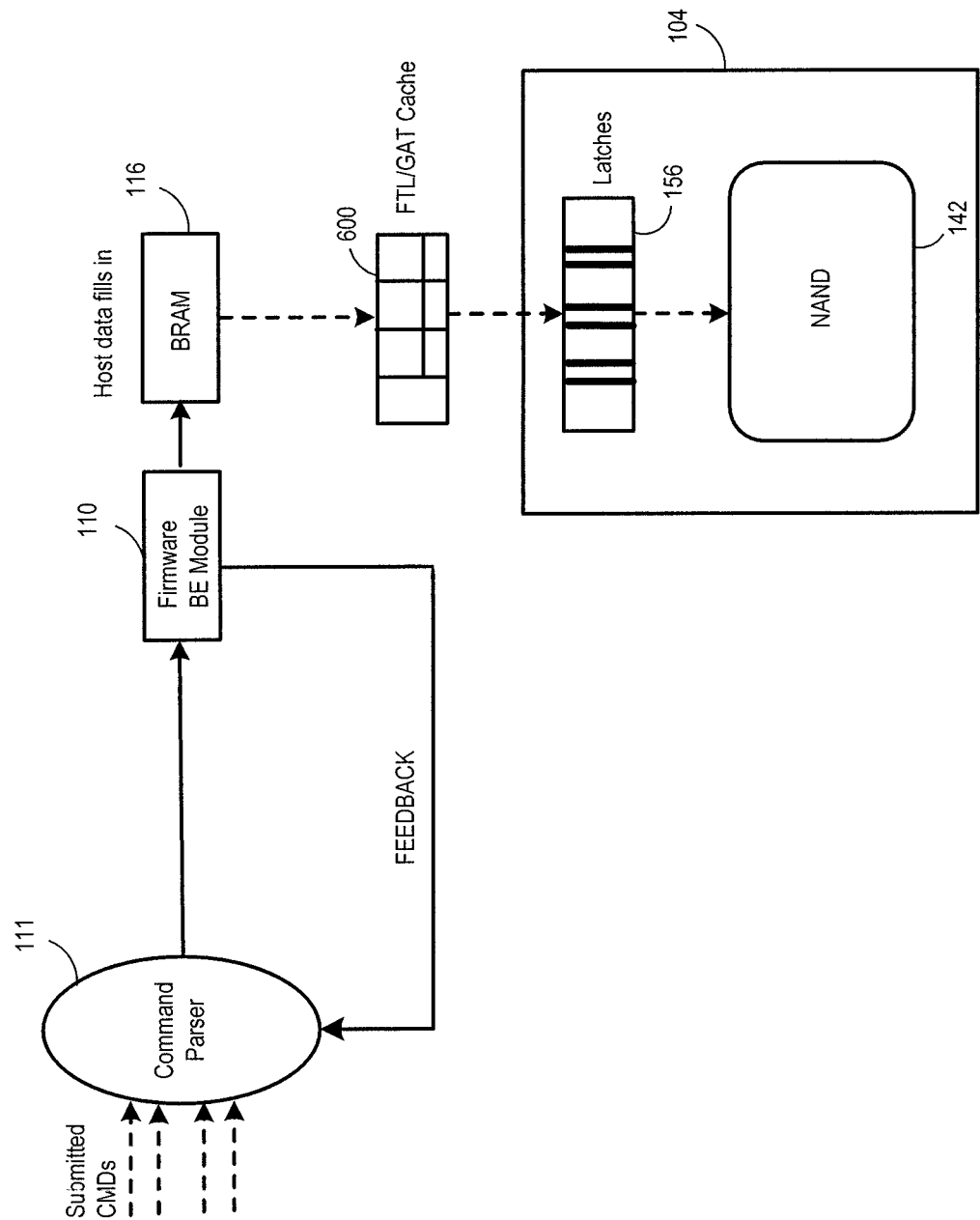
FIG. 6 is an illustration of a storage system of an embodiment in which a command parser receives feedback from a back end module regarding a cached portion of a logical-to-physical address map.

As noted above, other feedback information can be provided in addition to or instead of the occupancy level of a latch 156 in the memory 104. For example, in one embodiment, the feedback comprises an identification of logical addresses contained in a cached portion of a logical-to-physical address translation table. As discussed above, the flash management layer 132 in the back end module 110 can translate a logical address in a command received from the command parser 110 into a physical address in the memory 104. The logical-to-physical address map used for this translation can be stored in the memory 104. For faster access, the map can be cached in RAM 116 or other volatile memory (shown generally as 600 in FIG. 6) in or outside of the controller 102. If the map is too large to be cached in its entirety, only a portion of the map (e.g., a flash translation layer (FTL) page) can be cached. The feedback from the back end module 110 to the command parser 111 can indicate which portion of the map is cached (e.g., by a logical address range of the cached portion). With this information, the command parser 111 can choose to send those commands whose logical addresses are found in the cached portion of the table, rather than send commands whose logical addresses are not found in the cached portion of the table.

That is, based on the feedback received from the back end module 110 regarding the cached FTL pages, the command parser 111 can decide on the next write command to schedule, so that the back end module 110 can still reuse the FTL entries and limit the number for entries needed to be added to the portion of the map that is not cached (e.g., limit the number of existing FTL delta). This will help improve the random write performance since unnecessary flush-out/flush-in is avoided through this mechanism. That is, with this approach, commands whose FTL portion is already cached would be selected by the command parser 111 before commands whose FTL portion is not already cached, resulting in fewer delta additions, as the pages can be directly dirtied.

In another embodiment, the command parser 111 is configured to give priority to a write command that requires no more than the amount of free space remaining in a block of memory. In this way, the command parser 111 can send a write command that will not spill over to another block of memory. That is, metablock free space information can help the command parser 111 decide which write in the set of writes available in the queue 112 to pick. More specifically, the command parser 111 can pick writes that fall within the same metablock (i.e., to postpone write commands with spilling lengths to a newer (next) metablock to avoid FTL fragmentation).

Figure 7:
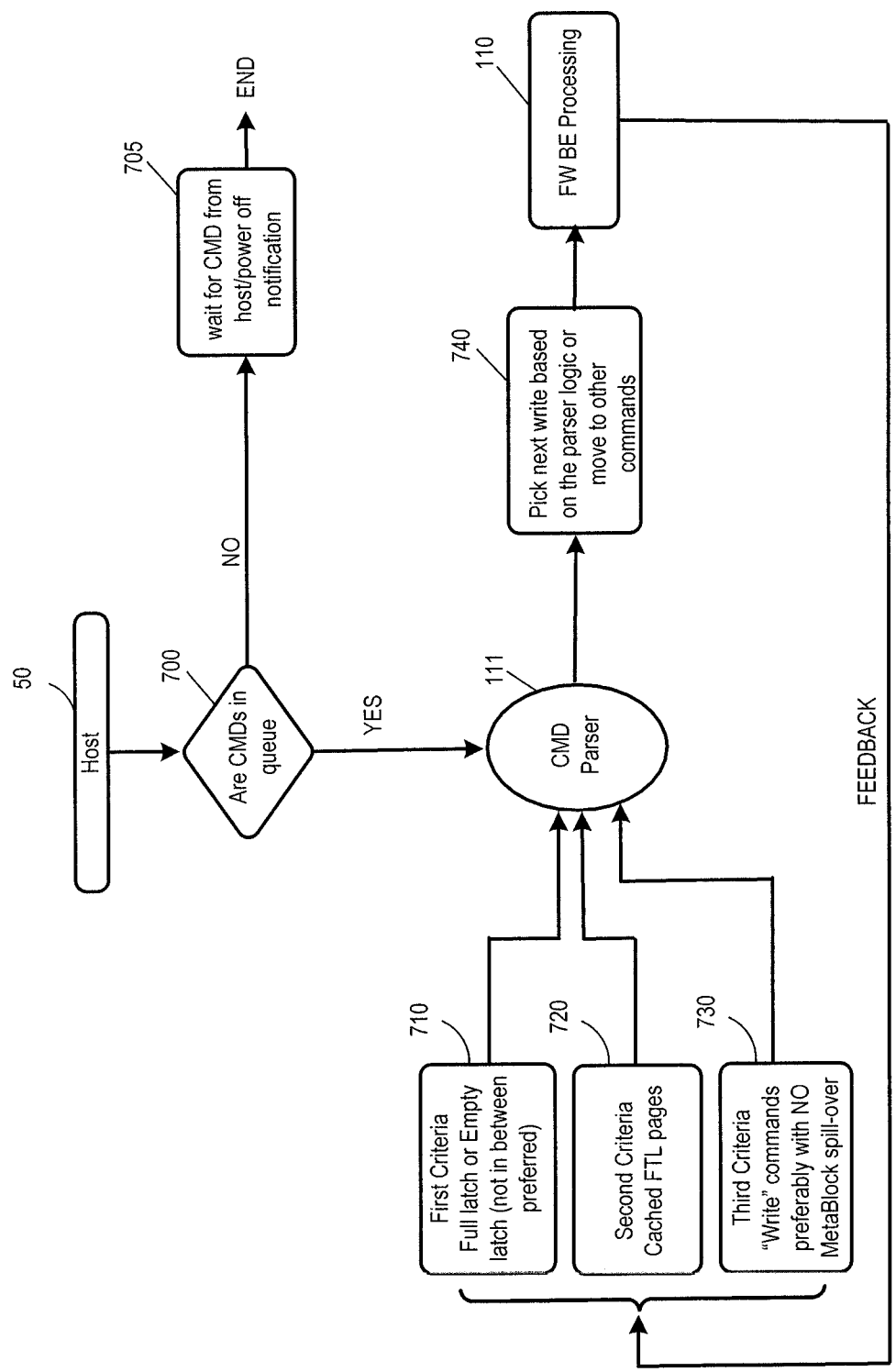
FIG. 7 is a flow chart of a method of an embodiment for soft-decision-based command execution to enhance random write performance.

Turning again to the drawings, FIG. 7 is a flow chart that illustrates these various embodiments. As shown in FIG. 7, the controller 102 in the storage system 100 first determines if there are commands in the queue 112 from the host 50 (act 700). If there aren't, the controller 102 waits for the commands from the host 50 or a power off notification (act 705). If there are commands in the queue 112, the command parser 111 in the controller 102 determines if any of three criteria 710, 720, 730 are present, which are provided via feedback from the back end module 110. With these criteria, the command parser 111 can provide soft-decision-based command execution to enhance random write performance (i.e., the command parser 111 can leverage information from the back end module 110 with soft decisions).

As shown in FIG. 7, in the example, the first criteria 710 is whether the latch 156 is full or empty. As explained above, it may be preferred to avoid non-optimum latch usage. So, based on the latch occupancy ratio for writes, the command parser 111 can decide whether to continue with writes for few more commands before breaking for a read, if due. In general, the fuller the latch 156, the higher the probability that it is best to write that data in the latch 156 to memory 142. The second criteria 720 in this example is cached FTL pages. As explained above, to avoid unnecessary switch of FTL pages and FTL delta additions, the command parser 111 can make sure to select writes that are within a similar range to be processed first. The third criteria 730 in this example is to write commands with preferably no block/metablock spillout (i.e., to avoid FTL fragmentation based on the space left in an open random write host metablock). Appropriately, the command parser 111 can choose write commands for processing such that, as much as possible, they fit and do not split across metablocks, as fewer splits mean fewer FTL entries and a better response during random read.

Based on the criteria present, the command parser 111 can pick the next write command based on the parser logic or move to other commands (act 740). The back end module 110 processes the commands send to it by the command parser 111.

It should be noted that the three criteria shown in FIG. 7 are merely examples, and more, fewer, or different criteria can be used. For example, a storage system can choose to implement a "mix and match" or all of the shown criteria, or different criteria. Also, although not shown in FIG. 7, if aged commands are of a concern, aged command handling can supersede this logic temporarily until all the aged commands are processed. Further, multiple threshold values can be mathematically tuned to come up with a dynamic system that gives considerable performance gains in the write path.

There are several advantages associated with these embodiments. As mentioned above, prior approaches pick the next write request solely based on the current state of the software queue, which results in flushing and reloading FTL pages from NAND, which slows the performance in the back end module and the overall performance of the system. For example, in prior systems, if the front end module receives a read command from a host while the back end module is processing write commands, the front end module can switch states from write to read and process the read command. This is done without taking into consideration the FTL table (currently residing in the system at that point of time), information about whether latches are partially or fully full, and if the block-length requested span across meta-blocks. As such, the system may not be optimum because, at a given state, other writes could have been served better if the command parser had more information on the back end module.

In contrast, the back end module of these embodiments provides the command parser 111 with one or more feedback parameters of the state of the back end module (e.g., the FTL pages already in RAM, the degree of latch availability, and the metablock free space left of a random write open block). The command parser can use this feedback information to decide the next write command to be picked from the queue to enhance/maintain a certain degree of performance level without unnecessarily switching the state of the system by unloading and reloading new FTL pages and/or flushing a semi-filled latch into NAND. This can increase the number of input-output operations per second ("IOPS"), which may be especially desired for storage systems with low RAM that need multiple loading and unloading of FTL pages.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby funning a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be foil led separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:
1. A storage system comprising:
   at least one latch;
   a memory; and
   a controller comprising:
      a command parser; and
      a set of components in a path between the command parser and the memory, wherein one of the components in the set of components is configured to determine whether the at least one latch is partially filled with data to be written in the memory;

wherein the command parser is configured to:
receive a plurality of commands from a host, wherein the plurality of commands comprises at least one read command and at least one write command;
receive feedback from the set of components that indicates that the at least one latch is partially filled with data to be written in the memory; and
in response to receiving the feedback from the set of components, send a write command to the set of components instead of a read command to further fill the at least one latch with data before flushing it to the memory.

2. The storage system of claim 1, wherein:
one of the components in the set of components is configured to perform logical-to-physical address translation based on a cached portion of a logical-to-physical address translation table; and
the feedback comprises an identification of logical addresses contained in the cached portion of the logical-to-physical address translation table.

3. The storage system of claim 2, wherein the command parser is further configured to give priority to a command having a logical address contained in the cached portion of the logical-to-physical address translation table over a command having a logical address that is not contained in the cached portion of the logical-to-physical address translation table.

4. The storage system of claim 1, wherein:
one of the components in the set of components is configured to track free space remaining in a block of memory; and
the feedback comprises an identification of the free space remaining in the block of memory.

5. The storage system of claim 4, wherein the command parser is further configured to give priority to a write command that requires no more than the amount of free space remaining in the block of memory over a write command that requires more than the amount of free space remaining in the block of memory.

6. The storage system of claim 1, wherein the memory comprises a three-dimensional memory.

7. The storage system of claim 1, wherein the storage system is removably connectable to the host.

8. The storage system of claim 1, wherein the storage system is embedded in the host.

9. A method for prioritizing commands in a storage system, the method comprising:
performing the following in a command parser in a controller of a storage system, wherein the storage system comprises a memory, and wherein the controller further comprises a backend module, wherein the backend module is configured to perform logical-to-physical address translation based on a cached portion of a logical-to-physical address map stored in cache:
receiving a plurality of commands from a host;
receiving feedback from the backend module, wherein the feedback comprises information about which logical addresses are included in the cached portion of the logical-to-physical address man; and
determining, based on the feedback from the backend module, an order in which to send the plurality of commands to the backend module, such that a command having logical address present in the cached portion of the logical-to-physical address map is given priority over a command having a logical address that is not contained in the cached portion of the logical-to-physical address map to avoid decreasing performance by reading another portion of the logical-to-physical address map from a location external to the cache.

10. The method of claim 9, wherein:
the feedback comprises information about how full a latch in the memory is; and
the command parser sends a write command instead of a read command responsive to the latch not being empty.

11. The method of claim 9, wherein:
the feedback comprises information about free space remaining in a block of memory; and
the command parser sends a write command that will not spill over to another block of memory.

12. The method of claim 9, wherein the memory comprises a three-dimensional memory.

13. The method of claim 9, wherein the storage system is removably connectable to the host.

14. The method of claim 9, wherein the storage system is embedded in the host.

15. A storage system comprising:
a memory;
back end means for processing and sending a command to the memory; and
front end means for receiving a plurality of commands from a host and determining, based on feedback from the back end means, an order in which to send the plurality of commands to the back end means, wherein the feedback comprises information about free space remaining in a block of the memory, and wherein the order is chosen to give priority to a write command that requires no more than the amount of free space remaining in the block of memory over a write command that requires more than the amount of free space remaining in the block of memory to avoid memory translation layer fragmentation.

16. The storage system of claim 15, wherein the front end means comprises a command parser.

17. The storage system of claim 15, wherein the memory comprises a three-dimensional memory.

* * * * *